US012141185B2

(12) United States Patent
Dasgupta et al.

(10) Patent No.: US 12,141,185 B2
(45) Date of Patent: Nov. 12, 2024

(54) SYSTEMS AND METHODS FOR GENERATING CAUSAL INSIGHT SUMMARY

(71) Applicant: Tata Consultancy Services Limited, Mumbai (IN)

(72) Inventors: Tirthankar Dasgupta, Kolkata (IN); Suyash Sangwan, Gurgaon (IN); Tushar Goel, Gurgaon (IN); Lipika Dey, Gurgaon (IN); Akshara Rai, Gurgaon (IN); Mohammad Shakir, Gurgaon (IN); Abir Naskar, Kolkata (IN); Ishan Verma, Gurgaon (IN); Aninda Sukla, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/732,816

(22) Filed: Apr. 29, 2022

(65) Prior Publication Data

US 2023/0079455 A1    Mar. 16, 2023

(30) Foreign Application Priority Data

Aug. 26, 2021  (IN) .............................. 202121038709

(51) Int. Cl.
*G06F 16/00* (2019.01)
*G06F 16/34* (2019.01)
*G06F 16/35* (2019.01)

(52) U.S. Cl.
CPC .......... *G06F 16/345* (2019.01); *G06F 16/358* (2019.01)

(58) Field of Classification Search
CPC ............................ G06F 16/345; G06F 16/358
See application file for complete search history.

(56) References Cited

U.S. PATENT DOCUMENTS 8,447,719 B2   5/2013  Bethke et al.
9,294,338 B2   3/2016  Nagai et al.
(Continued)

FOREIGN PATENT DOCUMENTS

CN       112631305 A      4/2021
WO    WO 2020/211275 A1  10/2020

OTHER PUBLICATIONS

Chakravarthy et al., "Domino at FinCausal 2020, Task 1 and 2: Causal Extraction System," (2020).
Gupta, "FiNLP at FinCausal 2020 Task 1: Mixture of BERTs for Causal Sentence Identification in Financial Texts," (2020).
Hussain et al., "A Practical Approach towards Causality Mining in Clinical Text using Active Transfer Learning," (2020).
Khetan et al., "Causal-BERT: Language models for causality detection between events expressed in text," (2021).
(Continued)

*Primary Examiner* — Syed H Hasan
(74) *Attorney, Agent, or Firm* — Finnegan, Henderson, Farabow, Garrett & Dunner, LLP

(57) ABSTRACT

Conventionally, text summarization has been rule-based method and neural network based which required large dataset for training and the summary delivered had to be assessed by user in terms of relevancy. System and method are provided by present disclosure that generate causal insight summaries wherein event of importance is detected, and it is determined why event is relevant to a user. Text description is processed for named entities recognition, polarities of sentences identified, extraction of causal effects sentences (CES) and causal relationship identification in text segments which correspond to impacting events. Named entities are then role labeled. A score is computed for named entities, polarities of sentences, causal effects sentences, causal relationships, and the impacting events. A causal insight summary is generated with overall polarity being computed/determined. A customized causal insight summary is delivered to target users based on user preferences
(Continued)

associated with specific named entities and impacting events.

18 Claims, 3 Drawing Sheets

(56) References Cited

U.S. PATENT DOCUMENTS

| | | | |
|---|---|---|---|
| 11,210,684 B1 | 12/2021 | Garg et al. | |
| 2015/0112664 A1* | 4/2015 | Srinivasan | G06F 40/30 |
| | | | 704/9 |
| 2018/0260474 A1* | 9/2018 | Surdeanu | G06F 40/211 |
| 2020/0402625 A1* | 12/2020 | Aravamudan | G06F 21/6245 |
| 2022/0318485 A1* | 10/2022 | Narayanan | G06F 40/30 |
| 2022/0366145 A1* | 11/2022 | Hosseini-Asl | G06F 40/284 |

OTHER PUBLICATIONS

Li et al., "Causality Extraction Based on Self-Attentive BILSTM-CRF with Transferred Embeddings," (2020).

Pawar et al., "Cause-Effect Relation Extraction from Documents in Mettalurgy and Materials Science," Transactions of the Indian Institute of Metals (2019).

Shao et al., "Extraction of causal relations based on SBEL and BERT model," Database, pp. 1-12 (2021).

Wang et al., "Back to Prior Knowledge: Joint Event Causality Extraction via Convolutional Semantic Infusion," (2021).

Yu et al., "Improving BERT-Based Text Classification With Auxiliary Sentence and Domain Knowledge," Digital Object Identifier (2019).

* cited by examiner

SYSTEMS AND METHODS FOR GENERATING CAUSAL INSIGHT SUMMARY

PRIORITY CLAIM

This U.S. patent application claims priority under 35 U.S.C. § 119 to: India Application No. 202121038709, filed on 26 Aug. 2021. The entire contents of the aforementioned application are incorporated herein by reference.

TECHNICAL FIELD

The disclosure herein generally relates to text summarization, and, more particularly, to systems and methods for generating causal insight summary.

BACKGROUND

Text summarization has attracted the attention of natural language processing (NLP) researchers for a long time. Basically, there are two broad kinds of summarization methods: extractive and abstractive. Extractive is a more guided or rule-based method in which key phrases or subset of sentences of the original text are selected and create a summary. Some of the conventional early efforts concentrated on scoring words and phrases based on their frequencies followed by sentence scoring methods. Another research work introduced Latent Semantic Analysis (LSA) based approach which uses a singular value decomposition on word-sentence matrix. One of the most successful text summarization systems called TextRank was introduced in 2004 which uses a graph-based algorithm similar to PageRank research work, in which similarity between two sentences is computed in terms of their content overlap. Later, enhanced TextRank was proposed in which there was a use of longest common substrings-based cosine distance between a pair of sentences. In recent years, machine learning methods have been used for domain specific summarization such as scientific paper summarization, biographical summaries and biomedical summaries. Numerous supervised approaches like SummaRuNNer, SummCoder based on deep neural networks have also been used for extractive summarization.

On the other hand, abstractive summarization is based on generating a new shorter text or new phrases that conveys the most critical information from the original text. Several approaches have been proposed for abstractive text summarization like semantic graph-based approach, sequence-to-sequence recurrent neural networks model, and via phrase selection and merging them to form a meaningful sentence. All these approaches required a big dataset for training such as dailymail, CNN dataset, Gigaword dataset, and the like.

SUMMARY

Embodiments of the present disclosure present technological improvements as solutions to one or more of the above-mentioned technical problems recognized by the inventors in conventional systems. For example, in one aspect, there is provided a processor implemented method for generating a causal insight summary. The method comprises obtaining, via one or more hardware processors, a text description from one or more sources; pre-processing, via the one or more hardware processors, the text description to obtain pre-processed text description; identifying, by using a named entity recognition technique via the one or more hardware processors, one or more named entities from the pre-processed text description; performing a sentiment analysis, via the one or more hardware processors, on the pre-processed text description to identify one or more polarities of sentences comprised in the pre-processed text description; extracting, via the one or more hardware processors, one or more cause effects sentences in the pre-processed text description and identifying one or more causal relationship between text segments in the one or more cause effects sentences, wherein the one or more cause effects sentences correspond to one or more impacting events; assigning, via the one or more hardware processors, a role label to each of the one or more named entities, wherein the role label corresponds to a role of each of the one or more entities in a corresponding event of the one or more impacting events; computing, via the one or more hardware processors, a score for one or more sentences in the text description based on a presence of (i) the one or more identified named entities based on the role label assigned, (ii) the one or more identified polarities, (iii) the one or more cause effects sentences, and (iv) the one or more impacting events; and generating, via the one or more hardware processors, the causal insight summary based on the computed score.

In an embodiment, each of the one or more cause effects sentences comprises an antecedent, a consequence, and a causal connector.

In an embodiment, interdependence of the one or more sentences is based on the position of (i) each of the one or more identified named entities, (ii) the one or more identified polarities, and (iii) the one or more cause effects sentences in the pre-processed text description.

In an embodiment, the text segments comprise at least one of (i) a cause, (ii) an effect, and (iii) an associated causal relationship.

In an embodiment, the method further comprises computing an overall polarity of the generated causal insight summary.

In an embodiment, the method further comprises communicating at least a portion of the generated causal insight summary to one or more target users based on an interest of the one or more target users for at least one of (i) one or more specific named entities, and (ii) the one or more impacting events.

In another aspect, there is provided a system for generating a causal insight summary. The system comprises a memory storing instructions; one or more communication interfaces; and one or more hardware processors coupled to the memory via the one or more communication interfaces, wherein the one or more hardware processors are configured by the instructions to: obtain a text description from one or more sources; pre-process the text description to obtain pre-processed text description; identify, by using a named entity recognition technique, one or more named entities from the pre-processed text description; perform a sentiment analysis on the pre-processed text description to identify one or more polarities of sentences comprised in the pre-processed text description; extract one or more cause effects sentences in the pre-processed text description and identify one or more causal relationship between text segments in the one or more cause effects sentences, wherein the one or more cause effects sentences correspond to one or more impacting events; assign a role label to each of the one or more named entities, wherein the role label corresponds to a role of each of the one or more entities in a corresponding event of the one or more impacting events; compute a score for one or more sentences in the text description based on a presence of (i) the one or more identified named entities based on the role label assigned, (ii) the one or more identified polarities, (iii) the one or more cause effects sentences, and (iv) the one or more impacting events; and generate the causal insight summary based on the computed score.

In an embodiment, each of the one or more cause effects sentences comprises an antecedent, a consequence, and a causal connector.

In an embodiment, interdependence of the one or more sentences is based on the position of (i) each of the one or more identified named entities, (ii) the one or more identified polarities, and (iii) the one or more cause effects sentences in the pre-processed text description.

In an embodiment, the text segments comprise at least one of (i) a cause, (ii) an effect, and (iii) an associated causal relationship.

In an embodiment, the one or more hardware processors are further configured by the instructions to compute an overall polarity of the generated causal insight summary.

In an embodiment, the one or more hardware processors are further configured by the instructions to communicate at least a portion of the generated causal insight summary to one or more target users based on an interest of the one or more target users for at least one of (i) one or more specific named entities, and (ii) the one or more impacting events.

In yet another aspect, there are provided one or more non-transitory machine-readable information storage mediums comprising one or more instructions which when executed by one or more hardware processors cause a method for generating causal insight summary. The method comprises obtaining, via the one or more hardware processors, a text description from one or more sources; pre-processing, via the one or more hardware processors, the text description to obtain pre-processed text description; identifying, by using a named entity recognition technique via the one or more hardware processors, one or more named entities from the pre-processed text description; performing a sentiment analysis, via the one or more hardware processors, on the pre-processed text description to identify one or more polarities of sentences comprised in the pre-processed text description; extracting, via the one or more hardware processors, one or more cause effects sentences in the pre-processed text description and identifying one or more causal relationship between text segments in the one or more cause effects sentences, wherein the one or more cause effects sentences correspond to one or more impacting events; assigning, via the one or more hardware processors, a role label to each of the one or more named entities, wherein the role label corresponds to a role of each of the one or more entities in a corresponding event of the one or more impacting events; computing, via the one or more hardware processors, a score for one or more sentences in the text description based on a presence of (i) the one or more identified named entities based on the role label assigned, (ii) the one or more identified polarities, (iii) the one or more cause effects sentences, and (iv) the one or more impacting events; and generating, via the one or more hardware processors, the causal insight summary based on the computed score.

In an embodiment, each of the one or more cause effects sentences comprises an antecedent, a consequence, and a causal connector.

In an embodiment, interdependence of the one or more sentences is based on the position of (i) each of the one or more identified named entities, (ii) the one or more identified polarities, and (iii) the one or more cause effects sentences in the pre-processed text description.

In an embodiment, the text segments comprise at least one of (i) a cause, (ii) an effect, and (iii) an associated causal relationship.

In an embodiment, the method further comprises computing an overall polarity of the generated causal insight summary.

In an embodiment, the method further comprises communicating at least a portion of the generated causal insight summary to one or more target users based on an interest of the one or more target users for at least one of (i) one or more specific named entities, and (ii) the one or more impacting events.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
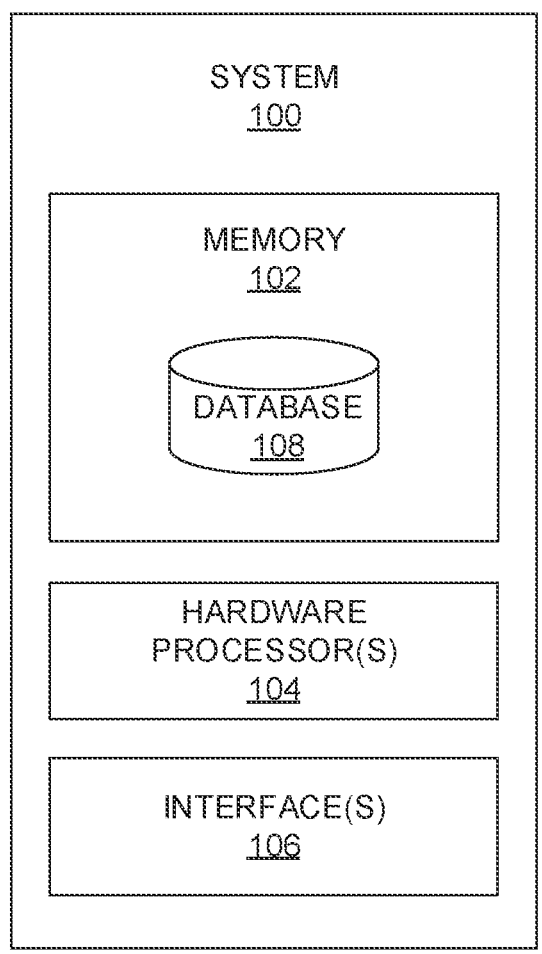
FIG. 1 depicts an exemplary system for generating causal insight summary, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In this era of knowledge economy, all organizations are experiencing the need to deliver relevant and timely actionable insights to their employees, customers, and partners about what is happening within an organization or in the outside world that is explicitly or implicitly related to them. These insights should be brief, crisp, and self-explanatory such that they can easily convey the key message to the receiver without information overload. Delivering the right and relevant alerts to the right employee at the right time is essential for proper functioning of a modern enterprise. On the other hand, getting real time alerts about financial entities, social disruptions, health, and safety events etc., are crucial for the conscious consumer today. Extracting and generating meaningful insights about relevant entities and delivering them in a personalized and timely manner is a challenging task.

An insight can be defined as a piece of knowledge derived from data or text document that is causal in nature and acts as a trigger for a future action. For example, insights about financial instruments can be derived from business news. Insights about future risks a company might face can be derived from its actions reported in news in isolation or in conjunction with user reaction to these reports. Insights differ from text summaries in a big way that they specifically must be causal in nature encapsulating elements of interest, incidents that might be reported to have impact on those elements of interest and/or also can be inferred based on additional external knowledge.

Though there exist several notification services that deliver tweets, targeted messages, News headlines or links to different kinds of articles, none of these systems provide insightful, self-explanatory summaries automatically created from textual content. Thus, it is left to the user to read, assimilate the information, and derive necessary insights from it by linking different information components that are relevant to him or her. This is not only time-consuming but also subjective and potentially error prone. Since users usually subscribe to channels and only have the option of applying some existing filters, they often end up receiving many more notifications than what is relevant for them directly. It is not only wasteful to receive a whole lot of information that are not at all potentially relevant, but users also often end up unsubscribing from such channels due to the information overload.

Though text summarization is a well-researched problem of Natural Language Processing, none of the summarization techniques focus on generating causal insights from large text. Further, no generic insight extraction mechanism exist that can be customized to work for different kind of entities and relations. Customizable summaries demand that an article may need to be summarized in different ways for different target groups, as their entities, concepts or relations of interest may be different.

Information distillation from unstructured text data has always been a core research area for text analytics researchers. Information rich text data in form of news is publicly available for consumption into analytics platform. However, with so many information source providers come the curse of information overload which if not managed could reverse the benefits of information availability.

Capturing the right information component from a pile of text is a challenging task. Moreover, information need of different users are also different. The same information may not be relevant for two different users. In the present disclosure, a system is provided that collects and processes text data, and delivers causal insights derived from text data to different users according to their interests.

Embodiments of the present disclosure provide system and method that generate summaries such as around stock movements and their reasons from business news articles, safety incidents, their probable causes, and penalties from safety reports as well as possible risks to the environment caused by organizational activities as reported in News or any other web channels. Such examples of summaries shall not be construed as limiting the scope of the present disclosure. More specifically, system and method are provided by the present disclosure for causal information extraction and a causal insight generation algorithm for generating causal insight summary. Apart from detecting event of importance, the system is responsible for providing insights as to why an event is relevant to a receiver.

News/Report data collected from web/internet is preprocessed/cleaned to obtain core text components along with all associated metadata like date, source and author etc. The text data is then subjected to Named entity extraction and sentiment analysis. Next, sentences mentioning cause-effects are identified and the cause-effect text segments/snippet comprised within the sentences are extracted. In one instance, text data is taken as inputs and various impacting events present in it are identified/detected. Customizable event indicator list acts as the pluggable component for this module with a generic algorithm that works independent of the domain of input indicator set.

The extracted information components and then passed to knowledge driven reasoner where entities identified are assigned role labels with respect to their role in an identified event, alias of entities are resolved to a common global representation and identified entities are enriched with knowledge derived from external semantic knowledge bases.

Subsequently, scores are computed for the sentences in the input text by factoring in the information components extracted as mentioned above. A least score optimal causal insight is generated next, as output. Lastly, user's interest in terms of events, entities, are pulled in and matched against the generated insights to create and deliver personalized insights through email/push mobile notifications.

Figure 2:
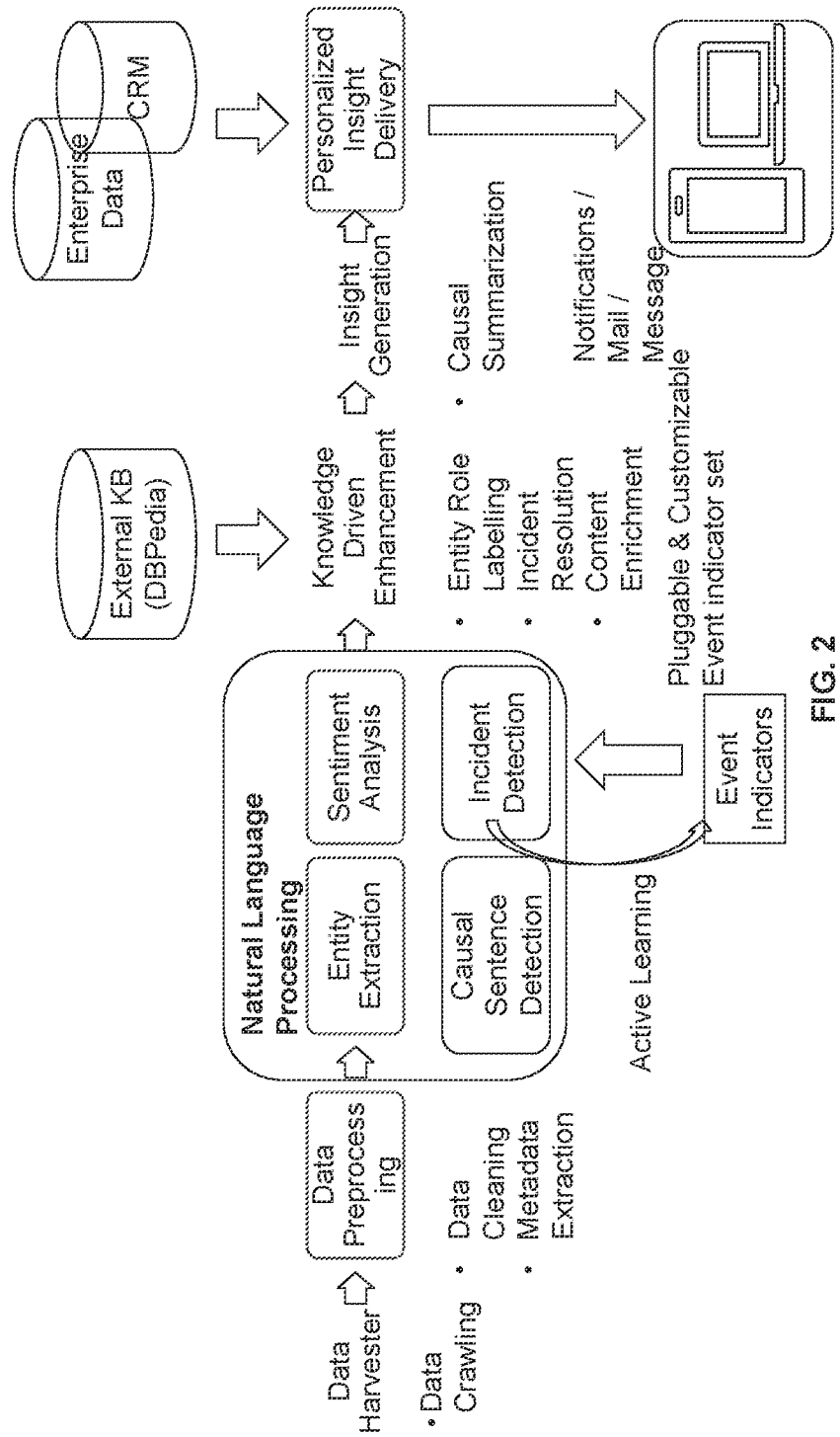
FIG. 2 depict an exemplary high level block diagram of the system of FIG. 1 for generating causal insight summary, in accordance with an embodiment of the present disclosure.
Figure 3:
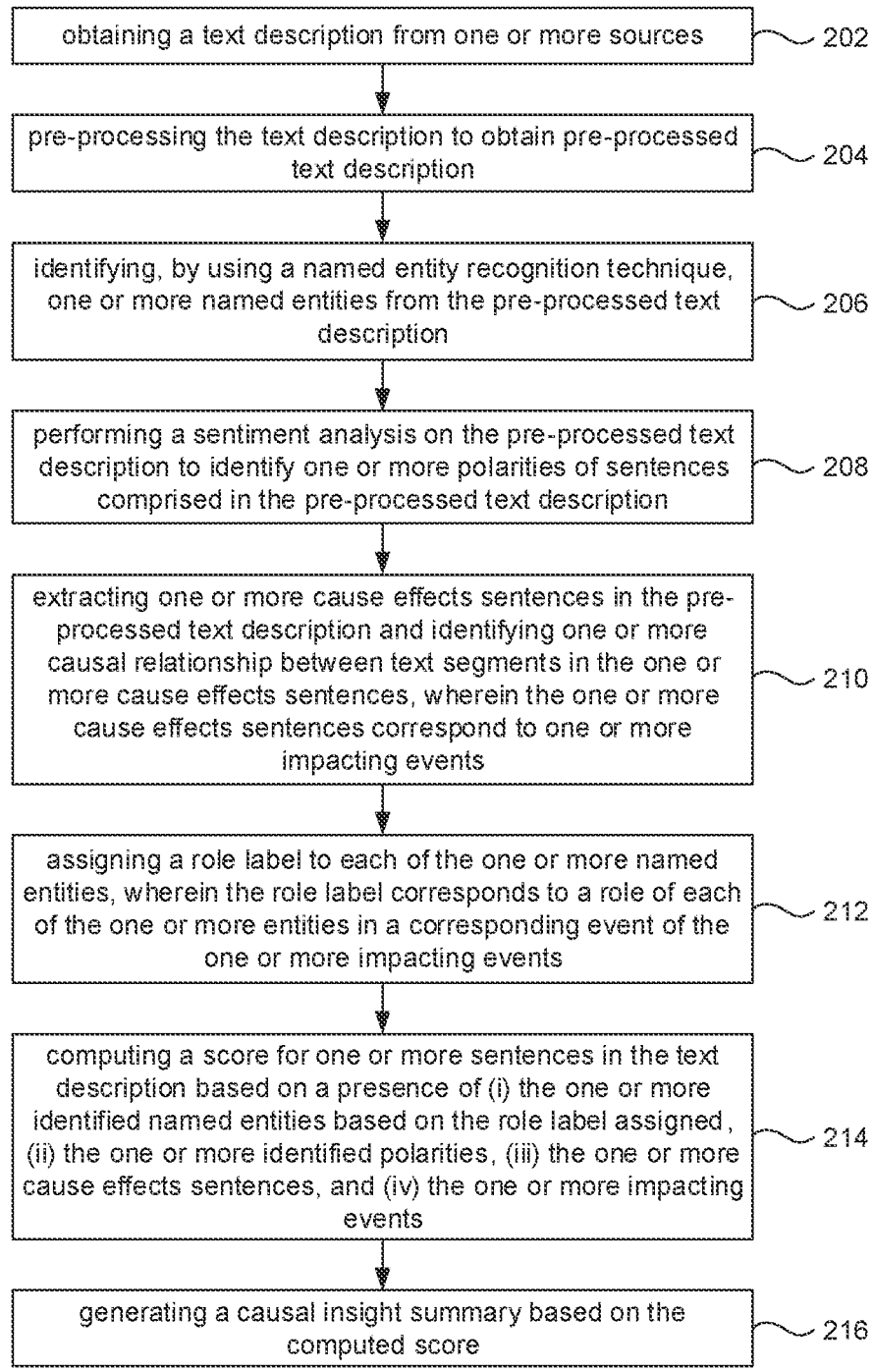
FIG. 3 depicts an exemplary flow chart illustrating a method generating causal insight summary, using the system of FIG. 1, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 depicts an exemplary system 100 for generating causal insight summary, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises text description (e.g., news, article, and the like) obtained from various sources (e.g., web portals, blogs, and the like). The database 108 further comprises one or more named entities extracted from the pre-processed text description, one or more identified polarities of sentences comprised in the pre-processed text description, one or more cause effects sentences, and one or more causal relationship identified between text segments in the one or more cause effects sentences, role labels of each named entity, score for one or more sentences in the text description, causal insight summary, and the like.

Further, the database 108 stores information pertaining to interdependence of the one or more sentences, and (i) a cause, (ii) an effect, and (iii) an associated causal relationship comprised in the text segments of the text description obtained. Furthermore, the database 108 comprises an overall polarity computed for the causal insight summary, interest/preferences of the one or more target users for whom the causal insight summary is delivered/communicated. The memory 102 further stores one or more techniques such as named entity recognition technique(s), sentiment analysis technique, and the like which when executed by the system 100 perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depict an exemplary high level block diagram of the system 100 for generating causal insight summary, in accordance with an embodiment of the present disclosure.

FIG. 3, with reference to FIGS. 1-2, depicts an exemplary flow chart illustrating a method generating causal insight summary, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3. In an embodiment, at step 202 of the present disclosure, the one or more hardware processors 104 obtain a text description from one or more sources. The text description may be news, or an article, a report, and the like from say a news portal, a blog, an incident reporting website, and the like. News data from the web is collected through RSS (e.g., RDF Site Summary or Really Simple Syndication) feeds provided by various news sources. A crawler module (refer FIG. 2) aggregates the published news links from various RSS feeds and then collects HTML data from the collected links. Other website data are gathered through crawlers. For instance, the system 100 receives the following news article headline and along with other related information as below:

Article 1: ABC Energy ordered to pay 500,000 USD after overcharging several thousands of customers
The above headline may be served as a link from an internet web portal, in one embodiment. The article may include text description of the new in detail and the language may be coarse in nature or may include other noise from the web portal(s). Thus, to obtain a clean text description, the text description of the above news headline article is pre-processed. For the sake of brevity, the entire news article is not shown.

In an embodiment of the present disclosure, at step 204, the one or more hardware processors 104 pre-process the above text description to obtain pre-processed text description. In an embodiment, the system 100 implements as known in the art pre-preprocessing technique(s) to eliminate/filter unwanted text from the news article/text description. Post pre-processing, the output serving as the pre-processed text description may include text as shown below:

"Title: ABC Energy to pay 500,000 USD for overcharging its customers
URL: www.newsintoday.com
Publication date: Wednesday Jul. 17, 2019, 8.30 AM US
S1: ABC Energy is to pay 500,000 USD in fines and compensation after overcharging around 8,000 customers.
S2: The company, which was known as Utility Inc. until being bought and renamed by a giant ABC Energy, overcharged on its default tariffs after the governments energy price cap was introduced in early 2019.
S3: ABC's watchdog XYZ found that between the first quarter of the year 2019 ABC Energy levied charges totaling 150,670.30 USD in excess of the cap.
S4: In addition, the supplier will pay 150,000 USD to YYY consumer redress fund to help support vulnerable customers and 75,000 USD in compensation, equating to a total payment of 375,000 approximately.
S5: The price cap for 8 million customers on poor value default tariffs came into force on 1 Jan. 2018.
S6: ABC Energy is the first company to face enforcement action for cap breaching.
S7: Other companies are understood to have cap breached but consumer detriment was significantly smaller than that caused by ABC Energy, so XYZ did not take enforcement action.
S8: ABC Energy will re-credit the accounts of affected customers with the amount they were overcharged plus additional compensation.
S9: Around 5,800 customer accounts were on tariffs that were not compliant with the price cap, in the sense they were paying above than the cap level for their gas, electricity or both.
S10: In addition to a refund each of these customers will receive an additional 15 per fuel.
S11: The remaining 2,300 customer accounts experienced a delay in their energy price being reduced under the price cap after they requested to change to a cheaper means of paying for their energy.
S12: This meant they were paying above the cap level for longer than necessary.
S13: They will each receive a refund plus an extra 4 per fuel.
S14: In total the 10,000 customer accounts affected around 8,100 customers.
S15: XYZ said it had taken into account the fact that ABC Energy had taken steps to address its failings and to pay redress.
S16: John Doe, chief executive of ABC Energy, apologized to all customers who were temporarily out of pocket.
. . .
S29: Purchasing Utility Inc in 2017 marked ABC's first step into retail gas and electricity supply as it looks to diversify away from its core fossil fuels business and take on the Big 4 energy suppliers.

S30: Majority of the groups 400 bn annual revenues approximately still come from oil and gas."

The above exemplary text description, S1, S2, and so on up to S30 reference correspond to number of sentences in the received text description/pre-processed text description.

In an embodiment of the present disclosure, at step 206, the one or more hardware processors 104 identify, by using a named entity recognition technique, one or more named entities from the pre-processed text description. For instance, named entities such as Organization, Person, Location, Money value, etc. are recognized/identified/extracted from the title and content of each collected article using one or more natural language processing libraries. In the present disclosure, the system 100 implemented spaCy NLP technique comprised in the memory 102 and invoked for execution. Spacy NLP API is natural language processing python API. For example, from the above pre-processed text description, some of the named entities extracted by the system 100 may include ABC Energy, John Doe, XYZ, Utility Inc., and the like. It is to be understood by a person having ordinary skill in the art or person skilled in the art that example of such NLP technique used for pre-processing of the text description shall not be construed as limiting the scope of the present disclosure.

In an embodiment of the present disclosure, at step 208, the one or more hardware processors 104 perform a sentiment analysis on the pre-processed text description to identify one or more polarities of sentences comprised in the pre-processed text description. In an embodiment of the present disclosure, the system 100 obtained polarity of sentences, paragraphs and documents using a known in the art sentiment analysis library such as flairNLP comprised in the memory 102 and invoked for execution. It is to be understood by a person having ordinary skill in the art or person skilled in the art that example of such NLP technique used for identifying one or more polarities of sentences comprised in the pre-processed text description shall not be construed as limiting the scope of the present disclosure. In the present disclosure, a few of the following exemplary polarities of sentences identified are shown below in Table 1 along with the corresponding score:

TABLE 1

| Sentences | Polarity/Sentiment | Score |
|---|---|---|
| ABC Energy is to pay 500,000 USD in fines and compensation after overcharging around 8,000 customers | Negative | −0.9987 |
| The company, which was known as Utility Inc. until being bought and renamed by a giant ABC Energy, overcharged on its default tariffs after the governments energy price cap was introduced in early 2019. | Negative | −0.9833 |
| ABC's watchdog XYZ found that between the first quarter of the year 2019 ABC Energy levied charges totaling 150,670.30 USD in excess of the cap. | Negative | −0.9975 |
| John Doe, chief executive of ABC Energy, apologized to all customers who were temporarily out of pocket. | Negative | −0.9941 |

TABLE 1-continued

| Sentences | Polarity/Sentiment | Score |
|---|---|---|
| Purchasing Utility Inc in 2017 marked ABC's first step into retail gas and electricity supply as it looks to diversify away from its core fossil fuels business and take on the Big 4 energy suppliers. | Positive | 0.9953 |
| Majority of the groups 400 bn annual revenues approximately still come from oil and gas. | Positive | 0.7116 |

In an embodiment of the present disclosure, at step 210, the one or more hardware processors 104 extract one or more cause effects sentences in the pre-processed text description and identify one or more causal relationship between text segments in the one or more cause effects sentences. The one or more cause effects sentences correspond to one or more impacting events. In other words, the one or more cause effects sentences are indicative of the impacting events. Cause effects sentences in text description (e.g., the pre-processed text description) are those that express causality between different elements mentioned in the text description. Cause effects sentences (e.g., also referred as causal sentences) contain one or more of the following an antecedent, a consequence, and a causal connector. In the above pre-processed text description, some of the cause effects sentences extracted by the system are shown below by way of examples:

1. ABC Energy is to pay 500,000 USD in fines and compensation after overcharging around 8,000 customers.
2. In addition, the supplier will pay 150,000 USD to YYY consumer redress fund to help support vulnerable customers and 75,000 USD in compensation, equating to a total payment of 375,000 approximately.
3. Other companies are understood to have cap breached but consumer detriment was significantly smaller than that caused by ABC Energy, so XYZ did not take enforcement action.
4. . . . .
5. Purchasing Utility Inc in 2017 marked ABC's first step into retail gas and electricity supply as it looks to diversify away from its core fossil fuels business and take on the Big 4 energy suppliers.
6. Majority of the groups 400 bn annual revenues approximately still come from oil and gas.

In the above extracted cause effect sentences, one or more causal relationship between text segments in the one or more cause effects sentences are identified. For instance, in sentence 1—the cause or antecedent herein refers to 'overcharging around 8,000 customers', in sentence 2—the cause or antecedent herein refers to 'the supplier will pay 150,000 USD to XYZ consumer redress fund to help support vulnerable customers and 75,000 USD in compensation' in sentence 3—the cause or antecedent herein refers to 'ABC Energy', . . . in sentence 5—the cause or antecedent herein refers to 'looks to diversify away from its core fossil fuels business and take on the Big 4 energy suppliers', and in sentence 6—the cause or antecedent herein refers to 'oil and gas'.

Similarly, consequence in the above cause effects sentence include such as 'ABC Energy is to pay 500,000 USD in fines and compensation', 'payment', 'consumer detriment', . . . 'marked ABC's first step into retail gas and electricity supply', and 'Majority of the groups 400 bn annual revenues' respectively. Similarly, associated causal relationship or causal connector include such as 'after' from sentence 1, 'to' from sentence 2, 'caused by' from sentence 3, . . . 'from' from sentence 6, respectively.

Joint model for causal effect sentence classification and causal relation extraction is performed based on Bidirectional Encoder Representations from Transformers (BERT)-based language model. As mentioned earlier, the first task is to identify causal effects sentences within a text description. Causal effect sentence classification is modelled as a binary classification problem. The predicted label y1∈ {0,1}, where 0 stands for a non-causal sentence and 1 indicates that the sentence contains causal relations. The difficulty of the task is highlighted with a pair of sentences below that look very similar but belong to different classes. It is important that the entire sequence of words that comprise cause, effect or causal connectives in a sentence are correctly labelled for better classification and further processing. The system 100 implements as known in the art BERT model (not shown in FIGS.), that generates contextual embedding for the input text, which is thereafter fed to a CNN-BiLSTM layer (not shown in FIGS.) followed by a fully connected layer (not shown in FIGS.) that jointly perform the sentence classification and sequence labelling tasks. It was observed that the joint models of BERT model and CNN-BiLSTM layer exploit the dependencies between the two tasks and thereby improve the performance over independent models. Below description on Fine-tuning the BERT Language Model as implemented by the system 100 is discussed:

BERT uses a multi-layer bidirectional Transformer encoder architecture based on the transformer model proposed by (Vaswani, 2017). It uses 12 layers of transformer blocks, 768 hidden units, and 12 self-attention heads. The model is pre-trained with two strategies on large-scale unlabeled text-masked language model and next sentence prediction. The input representation is a concatenation of Word-Piece embeddings, positional embeddings, and the segment embedding. The pre-trained BERT model provides a powerful context-dependent sentence representation and can be used for various target tasks through the fine-tuning procedure. Bio-BERT is another base model, that is specifically trained on Bio-medical literature. This can also be fine-tuned with task-specific data, if required.

Fine-tuning the pre-trained model with training data from different domains improves the performance of language processing tasks. The present disclosure and the system 100 implemented Xavier initialization to ensure that the BERT fine-tuning process converges. Further, early stopping of fine-tuning to 800 steps was set in order to prevent overfitting. A batch size 32, a maximum sequence length of 128, and a learning rate of 2*10-5 were used for fine-tuning this model.

Learning the Joint Model for Sentence Classification and Sequence Labelling Tasks is Described Below:

The sequence label prediction of a single word is dependent on predictions for surrounding words. It has been shown that structured prediction models such as cascaded CNN and LSTM models can significantly improve the sequence labelling performance. In (Zhou, 2015), it is stated that the performance of semantic role labelling improves by adding a conditional random field (CRF) layer along with a Bidirectional long short-term memory (BiLSTM) encoder. In the present disclosure, the system and method investigated the efficacy (not shown in FIGS.) of adding a CNN-BiLSTM layer for the combined tasks of sentence classification and sequence label prediction, on top of the BERT model.

For the causality classification and causal relation extraction task, the system 100 trained the CNN+BiLSTM layers using two loss functions separately. The system 100 used cross-entropy loss function to train the above models end-to-end. Given a set of training data, $x_t$, $w_t^i$, $\bar{y}_t$ and $\bar{w}_t^i$, where $x_t$ is the t-th word sequence to be predicted as causal or not-a causal text, $w_t^i$ is the i-th word within the sentence to be predicted as Cause (C), effect (E), causal connective (CN), and None (N), $\bar{y}_t$ and $\bar{w}_t^i$ are the one-hot representation of the ground-truth class labels for $x_t$ and $w_t^i$ respectively and $y^i$ and $y_n^s$ are the respective model predictions for both $x_t$ and $w_t^i$. Thus, the causality classification is predicted as:

$$y^i = \text{softmax}(W_i * h_1 + b_i) \quad (1)$$

wherein $W_i$—refers to weight matrix for a sentence, $h_1$—refers to hidden layer of the neural network, and $b_i$—refers to bias parameter of $i^{th}$ sentence.

On the other hand, for the sequence labelling task, the final hidden states of the BERT-CNN-LSTM network of the other tokens, $h_2, \ldots, h_T$, are fed into a softmax layer to classify over the sequence labels. To make this procedure compatible with the Word-Piece tokenization, each tokenized input word is fed into a Word-Piece tokenizer and the hidden state corresponding to the first sub-token is used as input to the CNN-BiLSTM network and finally to a softmax classifier. The output of the model is represented as:

$$y_n^s = \text{softmax}(W^s * h_n + b_s), n \in (1 \ldots N) \quad (2)$$

$W^s$—refers to weight matrix of a word in the entire sentence, $h_n$—refers to $n^{th}$ hidden layer in the neural network (where $h_n$ is the hidden state corresponding to the first sub-token of word $x_n$), and $b_s$—refers to bias parameter of individual word in the entire sentence. Thus, the loss functions for the text classification (L1) and causal relation extraction task (L2) are separately defined as:

$$L_1(\theta) = -\Sigma_{t=1}^N \Sigma_{j=1}^J \bar{q}_t^{i,j} \log(q_t^i) \quad (3)$$

$$L_2(\theta) = -\Sigma_{t=1}^M \Sigma_{k=1}^K \bar{y}_t^K \log(v_t) \quad (4)$$

Where $y_t$ is the vector representation of the predicted output of the model for the input sentence $x_t$. Similarly, $q_t$ is the vector representation of the predicted output of the model for the input word $w_t^i$. K and J are the number of class labels for each task. The model is fine-tuned end-to-end via minimizing the cross-entropy loss. The joint loss function using a linear combination of the loss functions of the two tasks as:

$$L_{joint}(\theta) = \lambda * L_1(\theta) + (1-\lambda) * I_{(y_{sentence}=1)} * L_2(\theta) \quad (5)$$

Where, $\lambda$ controls the contribution of losses of the individual tasks in the overall joint loss. $I_{(y_{sentence}=1)}$ is an indicator function which activates the causal relation labelling loss only when the corresponding sentence classification label is 1, since back-propagate relation labelling loss is not required when the corresponding sentence classification label is 0.

Referring to steps of FIG. 3, at step 212 of the present disclosure, the one or more hardware processors 104 assign a role label to each of the one or more named entities. The role label corresponds to a role of each of the one or more entities in a corresponding event of the one or more impacting events. It has been observed that a single document/text description may contain multiple different entities. Each entity has got a specific role in the overall semantics of the document. For example, if organization names as entities, then in the above example of pre-processed text description, the entities include ABC Energy, XYZ, that are playing the role and hence these entities are role labeled. Identification of entity names from a given text document/description can be done using any off the shelf named entity recognizers (e.g., as known in the art techniques). However, identification of semantic roles associated to each entity is a non-trivial task. Therefore, it is important to assign "role" labels to each entity based on their nature (Person/Organization/Money value etc.) etc.), semantic roles (Subject/and relative frequency scores. Key entities are thus differentiated from other entities. The entities of interests are needed to be provided to the system 100 wherein business rules and regular expressions are implemented (not shown in FIGS.) to identify the entities of interest from unstructured text documents. For example, if the entity of interest is the of interest is the target or offending organization name, then the algorithm to detect such organization name is depicted below:

Algorithm to Detect Target Organization Name from Unstructured Documents for Role Labeling:

In any document/text description, all the mentioned organizations may not be of interest to the user or may not be relevant to the causal summary. In order to identify the organizations/entities for pertinent to the text description, key organizations (Key_Org) and the organization committing an offence (Offending_Org) herein referred as role in the given scenario—role labelling is done by the following steps—

1. Organization NERs are first extracted using spacy. Let O be the set of extracted organization in document D
2. $\forall$ ŏ ε O, f(Ŏ) is calculated as the frequency of occurrence of ŏ in D.
3. $\forall$ ŏ ε O, ŏ ε Key_Org iff f(ŏ)>=2
4. For any organization ŏ in sentence S, ŏ ε Offending_Org iff an Event is detected in S and ŏ ε Key_Org Similarly, separate business rules and regular expressions are formed for other type of entities of interest.

In the above pre-processed text description, the role label is assigned to ABC Energy in the sentences, for example: ABC Energy is to pay 500,000 USD in fines and compensation after overcharging around 8,000 customers, ABC Energy is the first company to face enforcement action for cap breaching, and the like. Similarly, the role label is assigned to XYZ, and ABC Energy in the sentences, for example: ABC's watchdog XYZ found that between the first quarter of the year 2019 ABC Energy levied charges totaling 150,670.30 USD in excess of the cap, XYZ said it had taken into account the fact that ABC Energy had taken steps to address its failings and to pay redress, and the like.

In an embodiment of the present disclosure, at step 214, the one or more hardware processors, compute a score for one or more sentences in the text description based on a presence of (i) the one or more identified named entities based on the role label assigned, (ii) the one or more identified polarities, (iii) the one or more cause effects sentences, and (iv) the one or more impacting events. In one embodiment, sentence scores are generated on the basis of presence of information components, proximity, and inter-dependencies. Interdependence of the one or more sentences is based on the position of (i) each of the one or more identified named entities, (ii) the one or more identified polarities, and (iii) the one or more cause effects sentences in the pre-processed text description. In other words, interdependence of the one or more sentences is based on the position of (i) each of the one or more identified named entities, (ii) the one or more identified polarities, and (iii) the one or more cause effects sentences comprised/present in the pre-processed text description. The scoring mechanism as implemented by the system 100 assigns scores to sentences based on the role labels that are assigned to their content by the NLP technique(s) described herein and using the outputs of each step described herein. Sentences that contain one or more information components like entities, phrases, incidents etc. are better candidates for inclusion in the insights. Causal sentences are also considered better candidates for insight generation. Interdependence is approximated by closeness of occurrence of information components within text description. Thus, if a sentence contains incidents along with entities or other elements of interest or other elements of interest and is also causal, it can be a very good candidate for insight for insight generation. The scores computed for each of the above components is shown by way of examples in below Table 2:

TABLE 2

| Sentences | Extraction presence | | | | | | | Selection in optimal insight Selected |
|---|---|---|---|---|---|---|---|---|
| | ORG_ Present | MONEY_ Present | LOC_ Present | PENALTY_ Present | CAUSE_ EFFECT_ Present | VIOLATION_ Present | INCIDENT_ Present | |
| S1 | 1 | 0 | 0 | 1 | 1 | 0 | 0 | 1 |
| S2 | 1 | 0 | 0 | 0 | 0 | 0 | 0 | 0 |
| ... | ... | ... | ... | ... | ... | ... | ... | ... |
| S9 | 0 | 0 | 0 | 0 | 1 | 1 | 0 | 1 |

For the sake of brevity, interdependencies is shown in above table 2 for sentences S1, S2 and S9 and such examples shall not be construed as limiting the scope of the present disclosure.

Below Table 3 depicts inter and intra scores based on proximity and confidence between sentences in the text description. Table 3 also depicts a final score for each sentence of the text description:

TABLE 3

| Sentences | bucket_ 01 | bucket_ 02 | bucket_ 10 | bucket_ 11 | bucket_ 12 | bucket_ 20 | bucket_ 21 | bucket_ 22 | Final score |
|---|---|---|---|---|---|---|---|---|---|
| S1 | 14.28571429 | 10 | 19 | 17.28571429 | 15 | 0 | 0 | 0 | 38.08774601 |
| S2 | 6.666666667 | 5 | 4 | 3.166666667 | 2.5 | 0 | 0 | 0 | 16.61529553 |

TABLE 3-continued

| Sentences | bucket_ 01 | bucket_ 02 | bucket_ 10 | bucket_ 11 | bucket_ 12 | bucket_ 20 | bucket_ 21 | bucket_ 22 | Final score |
|---|---|---|---|---|---|---|---|---|---|
| S3 | 6.7 | 5 | 4 | 3.2 | 2.5 | 0 | 0 | 0 | 16.61703243 |
| S4 | 2.25 | 0 | 8 | 7.5 | 5 | 0 | 0 | 0 | 15.76151729 |
| S5 | 0 | 0 | 5.45785 | 6.124516667 | 3.45785 | 0 | 0 | 0 | 12.67639909 |
| ... | ... | ... | ... | ... | ... | ... | ... | ... | ... |
| S30 | 0 | 0 | 11.88916667 | 13.5225 | 11.1225 | 0 | 0 | 0 | 19.46935816 |

For the sake of brevity, interdependencies is shown in above Table 2 for S1, till S5 and S30 and such examples shall not be construed as limiting the scope of the present disclosure.

Sentence that contains at least one value is retained for scoring, while the remaining ones are assigned a score of 0. The final score assigned to a sentence depends on four factors, which are explained below:

1. Sentence-Title Similarity (TitleSim($S_i$)): Cosine similarity of sentence $S_i$ with title T is calculated using the sentence embeddings generated by Infersent. Since cosine similarity $\varepsilon[0,1]$, the system 100 boosts it with factor of $\omega$ ($>=1$) to ensure consistency among values ranges.

2. Confidence score from sentence type: Once all the entities are extracted, we assign a Confidence score to the extractions on the basis of how relevant they are to the domain using the following rules:

Confidence score is increased by reward R when—
   a. For any extracted value v of slot S found in sentence $S_i$, If v is present in the title
   b. For any extracted value v of slot S found in sentence $S_i$, If v is present in cause-conn-effect excerpt
   c. For any extracted organization ŏ, if ŏ $\varepsilon$ Key_Org or ŏ $\varepsilon$ Offending_Org
   d. If a sentence $S_i$ has cause-conn-effect extractions, a reward of 2*R is given when all 3 factors are extracted and R if 2 out of the 3 aspects are extracted Confidence score is given a penalty P when—
   a. POS($S_i$) is a pronoun, where POS is the part of speech of the subject of the sentence $S_i$.
      For example: in the sentence—'It has donated $2 m to the WHO fund so far.', the subject of the sentence, 'It', is not helping the reader comprehend the context of the sentence. Therefore, it is not very informative.

Here, R and P values as ($\omega$+1)/4

3. Intra-bucket score: Sentences containing values for certain slots also gain for being in proximity of other sentences containing values in the same bucket. As a corollary, between two sentences that contain values for the same slot, the one that contains additional values for other slots belonging to the same bucket scores higher. This is referred to as intra-bucket score of a sentence.

4. Inter-bucket score: Sentences also gain some weight from being in proximity to other sentences that contain values for slots from other buckets. The inter bucket proximity ensures that the overall context of all the findings remains consistent.

Proximity between two sentences $S_i$ and $S_j$, is computed as an inverse function of the distance between the sentences in the document.

Proximity($S_i, S_j$)=(1)/(1+Distance(($S_i, S_j$)))

Where distance($S_i, S_j$)=abs (position($S_i$)–position($S_j$)),
Where position($S_i$) indicates sentence number of $S_i$.
Let V={$v_1, v_2, \ldots v_m$} be the set of values required for insight generation. Then the scores for the sentence $S_i$ having a value $v_k$ is expressed as follows:

$$\text{Intra\_Bucket\_score} = \sum_k \left( \text{Confidence}(v_k) + \sum_p (\max(\text{Proximity}(S_i, S_j))) \right)$$

$\forall v_k, v_p \varepsilon V$, such that bucket($v_p$)=bucket($v_k$), $\forall$ j such that $S_j$ is the closest sentence that contains a value for a slot that belongs to the same bucket, including itself.

$$\text{Intra\_Bucket\_score} = \sum_k (\text{Confidence}(v_k)) + \sum_p (\max(\text{Proximity}(S_i, S_j)))$$

$\forall v_k, v_p \varepsilon V$, such that bucket($v_p$)·bucket($v_k$), $\forall$ j such that $S_j$ is the closest sentence that contains a value for a slot that belongs to the different bucket.

Score($S_i$) is now computed as:

Score($S_i$)=α(Intra Bucket Score Score($S_i$))+(1+α) (Inter Bucket Score Score($S_i$))+ω*TitleSim($S_i$) such that α>=0.5

The score is then normalized such that Score($S_1$) $\varepsilon[0,1]$.

Referring to steps of FIG. 3, at step 216 of the present disclosure, the one or more hardware processors 104 generate processors, a causal insight summary based on the computed score and the presence of (i) the one or more identified named entities based on the role label assigned, (ii) the one or more identified polarities, (iii) the one or more cause effects sentences, and (iv) the one or more impacting events in the pre-processed text description. In the present disclosure, the sentences S1 and S9 were selected based on the observations made in Table 2 and Table 3, therefore the system 100 generated a causal insight summary accounting for sentences S1 and S9 wherein the causal insight summary is depicted by way example below:

Generated Causal Insight Summary:

"ABC Energy is to pay 500,000 USD in fines and compensation after overcharging around 8,000 customers. Around 5,800 customer accounts were on tariffs that were not compliant with the price cap, in the sense they were paying above than the cap level for their gas, electricity or both."

In the above causal insight summary generated by the system 100, the organization/named entity is ABC Energy, penalty is pay 500,000 USD, violation is paying above than the cap level for their gas, electricity or both, cause is overcharging around 8,000 customers. Around 5,800 customer accounts were on tariffs that were and with the price cap, cause-effect connector (or cause connector) are after and with the price cap and effect is ABC Energy is to pay 500,000 USD in fines and compensation.

More specifically, in the above pre-processed text description, key organization extracted is ABC Energy, ESG Controversy: Fines→Environmental compliance→Environment for causal insight summary generation. The above generation of causal insight summary may be better understood by way of following description:

The objective is now to use the above scores to identify the minimal set of sentences that can form an insight (e.g., causal insight summary). Suppose there are 'm' slots divided into different buckets.

Let $S=\{S_1, S_2, \ldots S_n\}$ be the set of sentences which have a non-zero scores after computing scoring.

The following optimization technique/algorithm finds the minimal set of sentences that contain all the 'm' values, if present.

Let $VS(i,j)=1$, if value $v_i$ is found in sentence $S_j$
    0, otherwise

Let $x(i)=1$, if value $S_i$ is found in optimal insight
    0, otherwise

Then the objection function for the optimization problem is expressed as:

Maximize$\Sigma_i(x(i)*(Score(S_i)-1))$

Subject to constraints:

$\Sigma_i(VS(i,j)x(i))>=1 \forall v_j foundinD$     (C1—constraint 1)

$\Sigma_i(x(i))<=|V|$     (C2—constraint 2)

$\Sigma_i(x(i))>=1$     (C3—constraint 3)

The value (−1) is added in the objective function to ensure that minimum number of sentences are finally selected. The constraint in equation C1 ensures that at least 1 sentence is picked to cover each slot value, provided that value is reported by the document/text description/pre-processed text description. Finally, equations C2 and C3 enforce that at least 1 sentence is selected from the document and maximum number of sentences selected are no more than the type of values required to address the user given query. This is solved using Integer Linear programming, in one embodiment of the present disclosure. Such technique of solving the optimization problem shall not be construed as limiting the scope of the present disclosure.

Once the causal insight summary is generated by the system 100, the one or more hardware processors 104 computing an overall polarity of the generated causal insight summary. Below Table 4 depicts the generated causal insight summary along with the overall polarity score.

TABLE 4

| Article/News Headlines | Generated causal insight summary | Target Organization | Overall polarity (or Insight sentiment value) |
|---|---|---|---|
| ABC Energy to pay 500,000 USD for overcharging its customers | ABC Energy is to pay 500,000 USD in fines and compensation after overcharging around 8,000 customers. Around 5,800 customer accounts were on tariffs that were not compliant with the price cap, in the sense they were paying above than the cap level for their gas, electricity or both. | ABC Energy | −1.9984 |

The overall polarity/sentiment is based on a summation over selected sentences to report final insight sentiment (or causal insight summary), in one embodiment of the present disclosure. Computation of overall polarity score computation as described and shown above is one of an approach and such approach shall not be construed as limiting the scope of the present disclosure.

Once the generated causal insight summary, the one or more hardware processors 104 communicate/deliver at least a portion of the generated causal insight summary to one or more target users (e.g., target devices such as laptop, mobile communication device/devices via ticker information or tweets) based on an interest of the one or more target users for at least one of (i) one or more specific named entities, and (ii) the one or more impacting events. This may be referred as customized/personalized delivery of causal insight summary to target users/end users. For customized insight generation, a set of domain relevant entities and aspects that are of interest to the end user are obtained. While looking for summaries or insights about organizational violations the following categories can be considered: 1. Organization NER, 2. Cause, Conn Effect, etc., 3. Events 4. Location NER, 5. Money NER, and the like.

These categories are referred to as slots. Slots can further be bucketed together to ensure meaningful information extraction. Bucketing is done such that the factors that are required to occur close to each other in a text belong in the same bucket. It can be interpreted as a context provider for the information components to ensure that randomly occurring strings or values of a certain type are not accepted just because of the presence of a slot instance. For example, a sentence 'It said it had paid more than $ 2 bn in tax since 2000', a money value alone is not informative to the user, whereas when an organization is also associated with it like XYZMobile said it had also paid $440 m a year for the past 14 years", the sentence becomes much more relevant. Hence, Organization and Money NER can be placed in the same bucket.

Organizations/Users can express their requirements in the form of information components that are of interest to them and how the various components are interdependent or correlated. This can be specified using the bucket arrangements in the system 100. Different bucket arrangements enable the system to generate customized insights according to user requirements. Following are various scenarios for customized/personalized causal insight summary delivery.

Scenario 1: Obtain Insights about Organizational Violations and Incidents

Bucket arrangements can be chosen such that events reporting certain violation/incident and the penalty imposed can be selected for the insight. The insights generated using this arrangement presents the user with the target organization, the incident, and the resultant violation along with the associated penalty if any. In an embodiment, the customized causal insight summary may be same as shown in step 216 and is illustrated below:

Customized/personalized causal insight summary to a target user (e.g., say user 1)

ABC Energy to pay 500,000 USD for overcharging its customers

"ABC Energy is to pay 500,000 USD in fines and compensation after overcharging around 8,000 customers. Around 5,800 customer accounts were on tariffs that were not compliant with the price cap, in the sense they were paying above than the cap level for their gas, electricity or both."

Scenario 2: Obtain Insights from Business News to Support Personalized Wealth Advisory Relevant financial events and monetary extraction can be considered for users looking for investment opportunities and building their portfolio The bucket arrangement given below can be considered to present the organizations involved in a certain financial event. This can help them in better decision making.

Customized/personalized causal insight summary to another target user (e.g., say user 2)

IT majors beat street estimates in Q4—how should one play the sector/segment?

"Deal wins were very strong and impactful during the quarter with ABCD Textile Company reporting a record deal wins of $5 billion while XYZT Textile company reported new deal wins of $3.9 billion, Marc posted the numbers. We believe that investors should remain invested in IT companies given their breadth of offerings especially in digital technologies which will allow them to win large deals. Relevant Financial Event: Economic Performance."

It may be noted that such incidents as described above in the articles may be reported by other news sources and reports. Since, the same incident is reported in an article using different verbal representations, the k means clustering algorithm (Likas et al.,) is implemented by the system 100 to group all these instances together. The incidents are represented as vectors and clustered using cosine similarity as the distance function. For example, two fragments "failure to de energize plant equipment" and "failing to lock out energy sources represent the same incident semantic ally. The k means clustering algorithm as implemented by the system 100 groups these two events together. The implementation of the same is described below for better understanding of the embodiments discussed herein.

It is observed that a number of extracted safety related hazardous issues shows a high degree of semantic similarity. For example, "failure to de energize plant equipment" and "failing to lock out energy sources" represents the same semantic sense. Therefore, these events are grouped into cluster(s). Accordingly, similar incidents and violations are determined by executing an algorithm such as incident resolution. The algorithm follows the following steps: a) first identify the word embeddings of each constituent word of an event using GloVe representation (Pennington, 2014) and then phrase embeddings are created by computing a tensor product between the individual word and embeddings. For example, given two safety related issues $C_1=w_1, w_2, w_1$ and $C_2=w_1^i, w_2^i, \ldots, w_j^i$ where $w_1, w_2, \ldots, w_k$ and $w_1^i, w_2^i, \ldots, w_k^i$ are the constituent word embeddings of events $C_1$ and $C_2$ such that $i \neq j$, the phrase embedding $P_{(w_1,w_2)}$ is created by computing the tensor product of each adjacent word embedding pairs. This is represented as $P(w_1, w_2)=w_1 \otimes w_2$. Similar word and phrase embeddings are constructed for safety issue. The similarity is computed as $$S(C_1, C_2) = \frac{s' + s''}{N_1 + N_2}$$

where $N_1$ and $N_2$ are the cardinalities of $C_1$ and $C_2$ respectively. S' and S" are computed as:

$$S' = \Sigma_{\forall w_i \in C_1} S_{w_i}, S'' = \Sigma_{\forall p_1 \in C_1} S_{p_i}$$

Where $$S_{w_i} = \max_{\forall w_j^i \in C_2}\left(Sim(w_i, w_j^i)\right) \text{ and } S_{p_i} = \max_{\forall p_j^i \in C_2}\left(Sim(p_i, p_j^i)\right).$$

Again p and p' are the individual phrase embeddings in sentence and respectively. Sim(x,y) is the cosine similarity between the two word-vectors $w_x$ and $w_y$. Based on the similarity score, a k means clustering is performed to form clusters of similar causal events. "Average silhouette" method was used to identify number of clusters k. In the present disclosure, during the experiments conducted, the system 100 obtained the value of k as 21. The name of the cluster was chosen from the most common noun chunks present in the cluster. For example, incidents pertaining to falling of workers during construction sites are represented by the term "Fall Hazards". Similarly, incidents due to the release of hazardous chemicals are represented by "Chemical Hazards".

Conventionally, methods included for summarization included human intervention both in terms of interpretation of numerical data and summarization of text data from unstructured texts. Further, other existing methods involved use of linguistic rules identify causes and effect. However, linguistic rules are known to break down very easily. Further, some other conventional method used a knowledge base along with linguistic patterns to identify cause-effect. This system needs incidents to be defined in the knowledge base to recognize them as cause-effect in text. Since these are rules based, they may be prone to error.

Embodiments of the present disclosure address the technical problems of generating causal insight summaries to target users/end users wherein system and method are provided by the present disclosure that (i) curate heterogeneous streams of textual data, (ii) extract various elements such as entities, incidents, sentiments, causal relations, and others from each piece of content, (iii) link relevant content across sources, (iv) generate optimal, self-explanatory insights focused around elements of interest that are customizable, wherein the generated causal summaries are kept brief in nature to avoid information overload, (v) mechanism to deliver the insights as alerts in a personalized way by obtaining personalization data of users (user preferences, professional roles and responsibilities, behavior, investments, intent, etc.) from enterprise database, through different media, etc. The personalization uses business data shared by business systems, if any, as well as user profile data gathered by the engine itself, in one embodiment of the present disclosure.

As mentioned above, the system extracts entities, and causal information involving them automatically from text documents, generates domain driven customized insights enhanced with the necessary data and meta data and further uses these in conjunction with the enterprise data to deliver the insights in a personalized form. Implementation of the system 100 is a non-trivial task as it requires both technology expertise as well as system-level understanding from the user perspective. Extraction of targeted information and linking them to get an intelligent inference mechanism for e-personalized insight generation system is efficiently achieved by the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
obtaining, via one or more hardware processors, a text description from one or more sources;
pre-processing, via the one or more hardware processors, the text description to obtain pre-processed text description;
identifying, by using a named entity recognition technique via the one or more hardware processors, one or more named entities from the pre-processed text description;
performing a sentiment analysis, via the one or more hardware processors, on the pre-processed text description to identify one or more polarities of sentences comprised in the pre-processed text description;
extracting, via the one or more hardware processors, one or more cause effects sentences in the pre-processed text description and identifying one or more causal relationship between text segments in the one or more cause effects sentences, wherein the one or more cause effects sentences correspond to one or more impacting events;
performing, via the one or more hardware processors, extraction of a joint model related to the one or more cause effects sentences for causal effect sentence classification and causal relation extraction using a Bidirectional Encoder Representations from Transformers (BERT)-based language model;
generating, by the BERT based language model, contextual embedding for an input text, the input text being fed to a Convolution Neural Network (CNN) Bi-Long Short-Term Memory (LSTM) network and then fed to a fully connected layer, wherein the CNN Bi-LSTM and the fully connected layer jointly perform the causal sentence classification and sequence labelling tasks;
assigning, via the one or more hardware processors, a role label to each of the one or more named entities, wherein the role label corresponds to a role of each of the one or more entities in a corresponding event of the one or more impacting events;
computing, via the one or more hardware processors, a score for one or more sentences in the text description based on a presence of (i) the one or more identified named entities based on the role label assigned, (ii) the one or more identified polarities, (iii) the one or more cause effects sentences, and (iv) the one or more impacting events; and generating, via the one or more hardware processors, a causal insight summary based on the computed score.

2. The processor implemented method of claim 1, wherein each of the one or more cause effects sentences comprises an antecedent, a consequence, and a causal connector.

3. The processor implemented method of claim 1, wherein interdependence of the one or more sentences is based on the position of (i) each of the one or more identified named entities, (ii) the one or more identified polarities, and (iii) the one or more cause effects sentences in the pre-processed text description.

4. The processor implemented method of claim 1, wherein the text segments comprise at least one of (i) a cause, (ii) an effect, and (iii) an associated causal relationship.

5. The processor implemented method of claim 1, further comprising computing an overall polarity of the generated causal insight summary.

6. The processor implemented method of claim 1, further comprising communicating at least a portion of the generated causal insight summary to one or more target users based on an interest of the one or more target users for at least one of (i) one or more specific named entities, and (ii) the one or more impacting events.

7. A system comprising:
a memory storing instructions;
one or more communication interfaces; and
one or more hardware processors coupled to the memory via the one or more communication interfaces, wherein the one or more hardware processors are configured by the instructions to:
obtain a text description from one or more sources;
pre-process the text description to obtain pre-processed text description;
identify, by using a named entity recognition technique, one or more named entities from the pre-processed text description;
perform a sentiment analysis on the pre-processed text description to identify one or more polarities of sentences comprised in the pre-processed text description;
extract one or more cause effects sentences in the pre-processed text description and identify one or more causal relationship between text segments in the one or more cause effects sentences, wherein the one or more cause effects sentences correspond to one or more impacting events;
perform extraction of a joint model related to the one or more cause effects sentences for causal effect sentence classification and causal relation extraction using a Bidirectional Encoder Representations from Transformers (BERT)-based language model;
generate, by the BERT based language model, contextual embedding for an input text, the input text being fed to a Convolution Neural Network (CNN) Bi-Long Short-Term Memory (LSTM) network and then fed to a fully connected layer, wherein the CNN Bi-LSTM and the fully connected layer jointly perform the causal sentence classification and sequence labelling tasks;
assign a role label to each of the one or more named entities, wherein the role label corresponds to a role of each of the one or more entities in a corresponding event of the one or more impacting events;
compute a score for one or more sentences in the text description based on a presence of (i) the one or more identified named entities based on the role label assigned, (ii) the one or more identified polarities, (iii) the one or more cause effects sentences, and (iv) the one or more impacting events; and
generate a causal insight summary based on the computed score.

8. The system of claim 7, wherein each of the one or more cause effects sentences comprises at least one of an antecedent, a consequence, and a causal connector.

9. The system of claim 7, wherein interdependence of the one or more sentences is based on the position of (i) each of the one or more identified named entities, (ii) the one or more identified polarities, and (iii) the one or more cause effects sentences in the pre-processed text description.

10. The system of claim 7, wherein the text segments comprise at least one of (i) a cause, (ii) an effect, and (iii) an associated causal relationship.

11. The system of claim 7, wherein the eigen basis matrix (E) is obtained from a covariance matrix ($COV_p$) of the trajectory matrix (P) and a transpose matrix ($P^T$), and wherein $COV_p = 1/N-1PP^T$.

12. The system of claim 7, wherein the one or more hardware processors are configured by the instructions to communicate at least a portion of the generated causal insight summary to one or more target users based on an interest of the one or more target users for at least one of (i) one or more specific named entities, and (ii) the one or more impacting events.

13. One or more non-transitory machine readable information storage mediums comprising one or more instructions, which when executed by one or more hardware processors cause:
obtaining a text description from one or more sources;
pre-processing the text description to obtain pre-processed text description;
identifying, by using a named entity recognition technique, one or more named entities from the pre-processed text description;
performing a sentiment analysis on the pre-processed text description to identify one or more polarities of sentences comprised in the pre-processed text description;
extracting one or more cause effects sentences in the pre-processed text description and identifying one or more causal relationship between text segments in the one or more cause effects sentences, wherein the one or more cause effects sentences correspond to one or more impacting events;
performing extraction of a joint model related to the one or more cause effects sentences for causal effect sentence classification and causal relation extraction using a Bidirectional Encoder Representations from Transformers (BERT)-based language model;
generating contextual embedding for an input text, the input text being fed to a Convolution Neural Network (CNN) Bi-Long Short-Term Memory (LSTM) network and then fed to a fully connected layer, wherein the CNN Bi-LSTM and the fully connected layer jointly perform the causal sentence classification and sequence labelling tasks;
assigning a role label to each of the one or more named entities, wherein the role label corresponds to a role of each of the one or more entities in a corresponding event of the one or more impacting events;
computing a score for one or more sentences in the text description based on a presence of (i) the one or more identified named entities based on the role label assigned, (ii) the one or more identified polarities, (iii)

the one or more cause effects sentences, and (iv) the one or more impacting events; and generating a causal insight summary based on the computed score.

14. The one or more non-transitory machine-readable information storage mediums of claim 13, wherein each of the one or more cause effects sentences comprises an antecedent, a consequence, and a causal connector.

15. The one or more non-transitory machine-readable information storage mediums of claim 13, wherein interdependence of the one or more sentences is based on the position of (i) each of the one or more identified named entities, (ii) the one or more identified polarities, and (iii) the one or more cause effects sentences in the pre-processed text description.

16. The one or more non-transitory machine-readable information storage mediums of claim 13, wherein the text segments comprise at least one of (i) a cause, (ii) an effect, and (iii) an associated causal relationship.

17. The one or more non-transitory machine-readable information storage mediums of claim 13, wherein the one or more instructions which when executed by the one or more hardware processors further cause computing an overall polarity of the generated causal insight summary.

18. The one or more non-transitory machine-readable information storage mediums of claim 13, wherein the one or more instructions which when executed by the one or more hardware processors further cause communicating at least a portion of the generated causal insight summary to one or more target users based on an interest of the one or more target users for at least one of (i) one or more specific named entities, and (ii) the one or more impacting events.

* * * * *